US006891583B1

(12) United States Patent
Smith et al.

(10) Patent No.: US 6,891,583 B1
(45) Date of Patent: May 10, 2005

(54) PHOTOLUMINESCENT DISPLAY DEVICES HAVING A PHOTOLUMINESCENT LAYER WITH A HIGH DEGREE OF POLARIZATION IN ITS ABSORPTION, AND METHODS FOR MAKING THE SAME

(75) Inventors: Paul Smith, Zurich (CH); Christoph Weder, Gattikon (CH); Cees Bastiaansen, Maastrichi (NL); Christian Sarwa, Riehen (CH)

(73) Assignee: Eidgenössische Technische Hochschule Zurich, Zurich (CH)

( * ) Notice: Subject to any disclaimer, the term of this patent is extended or adjusted under 35 U.S.C. 154(b) by 0 days.

(21) Appl. No.: 09/476,358

(22) Filed: Jan. 3, 2000

Related U.S. Application Data

(63) Continuation of application No. PCT/IB98/00998, filed on Jun. 29, 1998.

(30) Foreign Application Priority Data

Jul. 3, 1997 (EP) ............................................ 97111229

(51) Int. Cl.⁷ .......................................... G02F 1/1335
(52) U.S. Cl. ...................................................... 349/71
(58) Field of Search .................... 349/164, 71; 359/490, 359/491, 492

(56) References Cited

U.S. PATENT DOCUMENTS

| | | | | |
|---|---|---|---|---|
| 3,679,309 A | * | 7/1972 | Hiragaki et al. ............. | 356/368 |
| 4,142,781 A | | 3/1979 | Baur et al. | |
| 4,425,029 A | * | 1/1984 | Funada et al. ............... | 349/164 |
| 4,822,144 A | * | 4/1989 | Vriens .......................... | 349/71 |
| 4,838,662 A | * | 6/1989 | Hilsum et al. ............... | 349/164 |
| 4,905,169 A | * | 2/1990 | Buican et al. ............... | 356/365 |
| 5,122,557 A | * | 6/1992 | Claussen et al. ............. | 524/162 |
| 5,204,038 A | * | 4/1993 | Heeger et al. ............... | 264/184 |
| 5,389,285 A | * | 2/1995 | Shannon et al. .......... | 252/299.1 |
| 5,408,109 A | * | 4/1995 | Heeger et al. ................. | 257/40 |
| 5,589,100 A | * | 12/1996 | Grasso et al. ........... | 252/299.01 |
| 5,618,868 A | * | 4/1997 | Misawa et al. .............. | 524/159 |
| 6,001,958 A | * | 12/1999 | Tapolsky et al. ............ | 528/360 |
| 6,383,665 B1 | * | 5/2002 | Bao et al. ..................... | 428/690 |
| 6,402,994 B1 | * | 6/2002 | Marder et al. ............... | 252/582 |

OTHER PUBLICATIONS

Weder et al., "Polarized Photoluminescence from Oriented Films Based on Blends of Polyethylene and Conjugated Polymers", Proceedings of the 1997 ACS San Francisco Meeting, Apr. 1997, pp. 404–405.

Cimrova et al., "Polarized Light Emission from LEDs Prepared by the Langmuir–Blodgett Technique", Advanced Materials, Feb. 1996, pp. 146–149.

Lussem et al., "Polarized electroluminescence of light emitting liquid crystalline polymers", Liquid Crystals, Aug. 1996, pp. 903–907.

Weder et al, "Efficient Solid–State Photoluminescence in New Poly (2.5–dialkoxy –p–phenyleneethynylenne)s", Macromolecules 1996, pp. 5157–5165

Hamaguchi et al., "Polarized electroluminescence from rubbing–aligned poly(2, 5–dinonyloxy–1, 4–phenylenevinylene) films", Applied Physics Letters, Dec. 1995, pp. 3381–3383.

Weder et al, "Incorporation of Photoluminescent Polarizers into Liquid Crystal Displays", Science, Feb. 1995, pp. 835–837.

* cited by examiner

*Primary Examiner*—Kenneth Parker
(74) *Attorney, Agent, or Firm*—Mayer Brown Rowe & Maw LLP

(57) ABSTRACT

Display devices are disclosed of a high brightness, high contrast and large viewing angle that comprise at least one thin, photoluminescent layer that is characterized in a high degree of polarization in its absorption. Also disclosed are methods for making same.

23 Claims, 11 Drawing Sheets

PHOTOLUMINESCENT DISPLAY DEVICES HAVING A PHOTOLUMINESCENT LAYER WITH A HIGH DEGREE OF POLARIZATION IN ITS ABSORPTION, AND METHODS FOR MAKING THE SAME

This is a International Appln. No. PCT/IB98/00998 filed Jun. 29, 1998 which designated the U.S.

FIELD OF THE INVENTION

The present invention relates to display devices and in particular to displays comprising at least one photoluminescent layer that is characterized in a high degree of polarization in its absorption. The invention also relates to methods to produce such devices.

BACKGROUND OF THE INVENTION

Optoelectronic display devices, such as those based on the Electrically Controlled Birefringence (ECB) effect, the Twisted Nematic (TN) effect and Super-Twisted Nematic (STN) effect (S. W. Depp et al., Sci. Am. Vol. 268, p. 40 (1993); T. Scheffer et al., in "Liquid Crystals, Applications and Uses", Vol. 1. B. Bahadur, Ed., Chapter 10, pp. 231–274 (1990), Worlds Scientific. Singapore; S. Morozumi, ibid., Chapter 7, pp. 171–194), are well known in the art and are of major importance in a large variety of applications.

In these devices (cf. FIG. 1A), typically, a liquid crystalline material is sandwiched in a cell (3) between two light-polarizing means (4) and the liquid crystalline material is used to electrically rotate the polarization direction of polarized light and, thus, the structure functions as a light valve. Polarized light is produced in these devices by a first polarizer, and a second polarizer (also referred to as analyzer) is used to generate visual perception of the electrical switching of the liquid crystalline material.

As is well established in the prior art, a thin layer of well-ordered liquid crystalline material has the ability to change the state of polarization of light that passes through it. As the LC order can be controlled by means of an electrical field, electric switching can modulate the polarization of the transmitted light. Thereto, typically, a cell structure (cf. FIGS. 1A, B), based on spacered transparent carrier plates (3b) and provided with two transparent electrodes (3c), is utilized where in between the thin layer of LC material (3a) is applied. The transparent electrode material can be, for instance, indium tin oxide, but may also consist of a transparent conducting polymer. In the field-off state, or at low voltages below a threshold value (switching state "off"), the molecular organization within the liquid crystal layer is planar and well-controlled by orientation layers (3d) applied on the electrodes and/or by the presence of small amounts of chiral dopants in the liquid crystal mixture. Well-known and widely used effects are: (i) electrically controlled birefringence effect in which the molecules are aligned unidirectionally (parallel alignment at the orientation layers, no chiral dopant); and (ii) twisted nematic or super-twisted nematic effects in which the molecules are rotated over, for instance, 90° (TN) by means of a perpendicular alignment at the orientation layer. In the field-on state (switching state "on"), the LC molecules align themselves along the electrical field lines. In the limit, i.e. at the fully addressed state at higher voltages, the LC material is aligned perfectly perpendicular to the electrode surfaces and behaves isotropically for the light which passes parallel to the field lines. This means that the state of polarization of light that passes the cell remains unaffected. At intermediate voltages, also intermediate states of orientation can be achieved in which the director, being the local direction of the average orientation of the LC molecules, describes a complicated pattern over the thickness of the cell, which can be used to create intermediate scales between the fully-off and the fully-on state.

When these devices comprise only conventional absorbing polarizers, they change upon switching from a light grey to a dark appearance. Colors are generated by using, for example, additional color filters (U.S. Pat. No. 5,099,345) or a series of selective dichroic, filtering polarizers (U.S. Pat. No. 5,122,887).

A common dichroic sheet polarizer usually absorbs at least 50% of the incident light. In a typical TN display, more than 80% of the incident light is absorbed by the polarizers and color filters and, consequently, the brightness of the displays is very limited. The poor light efficiency of these displays, generally, is compensated by rather intense backlighting, which limits the life-time of batteries in devices such as lap-top computers and portable telephones. Moreover, conventional polarizers transfer the absorbed light into heat and, consequently, exhibit excessive heating-up when used in combination with high-intensity light sources. These high-intensity light sources are employed in applications such as projection televisions, and the polarizers limit the life-time of the displays in these applications. Also in reflective-mode devices, the above concerns with respect to efficiency of polarizers and color filters lead to poor visibility.

The use of photoluminescent, for example fluorescent or phosphorescent, matter to overcome these problems has been described. For example. U.S. Pat. No. 3,844,637 discloses the use of fluorescent liquid crystals. Fluorescent material dissolved or dispersed in liquid crystals also has been suggested (U.S. Pat. No. 4,336,980; H. J. Coles et al., Liq. Cryst., Vol. 14, pp. 1039–1045 (1993)). The use of fluorescent particles as a light trap was described in U.S. Pat. No. 4,405,210. U.S. Pat. No. 4,470,666 discloses the use of a partially transmissive fluorescent color filter. U.S. Pat. Nos. 4,113,360, 4,394,068 and 5,018,837, W. Greubel et al. (Elektronik. Vol. 6., pp. 55–56 (1977)) and M. Bechtler et al. (Electronics December 8, pp. 113–116 (1977)) describe the use of a plate of fluorescent synthetic material in displays as a light trap. U.S. Pat. No. 5,608,554 describes the use of a phosphor layer to enhance the luminance and viewing angle of standard liquid crystal display devices. Also, the use of a layer comprising fluorescent species in the three primary colors has been disclosed (French application FR 2 600 451-A1; U.S. Pat. No. 4,678,285). German patent No. DE 2640909 C2 and G. Baur et al. (Appl. Phys. Lett. Vol. 31, pp. 4–6 (1977); W. Greubel et. al., Elektronik, pp. 55–56 (1977)) disclose a display device that comprises an at least partially mirrored polymer plate (cf. FIG. 2, (A)) in which a fluorescent dye is dissolved and that further comprises a means (B) positioned behind the polymer plate (A), from the light-exit direction, that allows transmission of only that part of the light spectrum that is absorbed by the fluorescent plate (A). Furthermore, in the same patent, which is directed towards the use of a fluorescent plate as a light trap in displays, it is suggested that a plate (A) can be used in which form-anisotropic fluorescent molecules are dissolved in a uniform orientation within the polymer plate. The proposed display configurations suffer a number of drawbacks, most of which are directly related to the dimensions of the plate. First, the light collection area of the fluorescent plate must be substantially larger than the area of the electrooptical light valve to provide enough of the necessary radiation. These displays are therefore only suitable for applications where there is enough room for such a plate such as measuring instruments or digital clocks (M. Bechter et. al., Electronics, December 8, pp. 113–116 (1977)). Secondly, according to other publications by the authors of the prior art patent (G. Baur et al., Appl. Phys. Lett., Vol. 31, pp. 4–6 (1977): W. Greubel et. al. Elektronik, pp. 55–56 (1977)) the fluorescent plate needs to be thick (>1 mm) to generate a high absorption of environmental light. According to the authors, the dye concentration in the plate must be low to avoid "self-absorption" and consequently the plate thickness must be high to generate a light absorption close to 100%. The absorption (A) of the incident light on the surface of the plate is:

$$A = 1 - 10^{\epsilon(\lambda)ct}$$

where $\epsilon(\lambda)$ is the molar extinction coefficient of the fluorescent dye at wavelength $\lambda$, c is the molar concentration of the fluorescent dye and t is the plate thickness. According to publications by the authors of the prior art patent (G. Baur et al., Appl. Phys. lett., Vol. 31, pp. 4–6 (1977); W. Greubel et. al., Elektronik, pp. 55–56 (1977)) typical values for the extinction coefficient of the fluorescent dye and the dye concentration are, respectively, $10^4$ L/mole·cm and $10^{-3}$ mole/L. Consequently, a plate with a thickness of 1.5 mm is required to generate an absorption of 97% of the incident light, but also plates thicker than 7.5 mm were fabricated and used (G. Baur et al., Appl. Phys. Lett., Vol. 31, pp. 4–6 (1977); W. Greubel et, al. Elektronik, pp. 55–56 (1977)). Hence, the large thickness of the plates increases the dimensions of the display devices also in the thickness direction. As a consequence, thin or, for instance, flexible displays cannot be manufactured. In addition, again according to G. Bauer et. al. (Appl. Phys. Lett., Vol. 31, pp. 4–6 (1977)) the plates act as waveguides for the fluorescent light and the light travels distances between 1 to 100 cm in the plate before it is coupled out. Consequently, the light output (brightness) is strongly reduced by the overlap of the absorption and emission spectrum of the fluorescent dyes. To minimize other light losses, plates have to be produced from highly transparent materials with perfect optical surfaces and perfectly reflecting layers at the narrow sides are required.

Unfortunately, the above improvements have failed to yield display devices which can be used in a large range of applications in an economical and satisfactory way, and the need continues to exist for more efficient displays of high brightness, high contrast, a wide viewing angle, and optional multiple colors.

SUMMARY OF THE INVENTION

One object of the present invention to overcome the problems of the prior art displays, is to provide a display device that comprises at least one thin, photoluminescent layer that is characterized in a high degree of polarization in its absorption and that is characterized by an emission which is either polarized or not polarized, depending on the particular device configuration.

Another object of the present invention it to provide a display device that comprises one photoluminescent layer that is characterized in a high degree of polarization in its absorption, and one polarizer or analyzer.

Another object of the present invention it to provide a display device that comprises one photoluminescent layer that is characterized in a high degree of polarization in its absorption and in a high degree of polarization in its emission, and one polarizer or analyzer.

Yet another object of the present invention is to provide a display device that comprises a first photoluminescent layer that is characterized in a high degree of polarization in its absorption, and a second photoluminescent layer that is characterized in a high degree of polarization in its absorption, and that is further characterized in that the two layers have different photoemission or absorption spectra or both.

Another object of the present invention is to provide a display device that comprises a first photoluminescent layer that is characterized in a high degree of polarization in its absorption and in a high degree of polarization in its emission, and a second photoluminescent layer that is characterized in a high degree of polarization in its absorption and in a high degree of polarization in its emission, and that is further characterized in that the two layers have different photoemission or absorption spectra or both.

Still another object of the present invention is to provide a display device that comprises multiple photoluminescent layers that are characterized in a high degree of polarization in their absorption, and multiple electrooptic light valves, arranged in a stacked fashion, and that is further characterized in that the layers different photoemission or absorption spectra or both.

Yet another object of the present invention is to provide a display device that comprises multiple photoluminescent layers that are characterized in a high degree of polarization in their absorption and in a high degree of polarization in their emission, and multiple electrooptic light valves, arranged in a stacked fashion, and that is further characterized in that the layers different photoemission or absorption spectra or both.

Another object of the present invention is to provide a display device that comprises at least one thin, photoluminescent layer that is characterized in a high degree of polarization in its absorption and that is characterized by an emission which is either polarized or not polarized and that is characterized by small dimensions in the thickness direction and area.

Yet another object of the present invention is to provide method to improve the brightness or contrast or both of an optoelectronic display by incorporation of least one thin, photoluminescent layer that is characterized in a high degree of polarization in its absorption and that is characterized by an emission which is either polarized or not polarized.

Still another object of the present invention is to provide method to improve the viewing angle of an optoelectronic display by incorporation of least one thin, photoluminescent layer that is characterized in a high degree of polarization in its absorption and that is characterized by an emission which is either polarized or not polarized.

Other objects of the present invention will become apparent to those skilled in the art in the following detailed description of the invention and the appended claims.

The present invention is based on our surprising finding that display devices comprising at least one thin photoluminescent layer that is characterized in a high degree of polarization in its absorption and in an emission that is either polarized or not are of a very high brightness and very high contrast, have an excellent viewing angle, and can be configured to exhibit one or more colors that cover the entire visible portion of the spectrum of light useful for display applications. Hereinafter, the designation photoluminescent and photoluminescence are abbreviated with the designation PL, and further, the term polarized PL layer refers to a photoluminescent layer that is characterized in a high degree of polarization in its absorption and that is characterized in an emission which is either polarized or not polarized. Most importantly, we found that the polarized PL layers should be thin and should exhibit a dichroic ratio in their absorption that exceeds a minimum value, and, depending on the particular device configuration, sometimes also a minimum value of the dichroic ratio in their emission, in order to yield displays with the above desired characteristics. Hereinafter, device elements such as layer, electrooptical light valve, polarizer, light source, and mirror are sometimes referred to in their singular form, which should not be construed as to imply that reference is made to only one such element. Similarly, sometimes reference is made to a plurality of elements, which should not be construed as to imply that reference is made only to multiple elements.

Herein, the dichroic ratio in absorption is defined as the ratio of the highest possible absorption of linear polarized light (measured with the orientation direction of the PL layer parallel to the polarization direction of the incident polarized light) and the lowest possible absorption of linear polarized light (measured with the orientation direction of the PL layer perpendicular to the polarization direction of the incident polarized light). These absorptions are measured at the same single wavelength somewhere within the absorption spectrum and preferentially at an absorption maximum.

Herein, the dichroic ratio in emission is defined as the highest possible emission intensity of linear polarized light (measured trough a linear polarizer with its polar axis parallel to the orientation direction of the PL layer) to the lowest possible emission intensity of linear polarized light (measured trough a linear polarizer with its polar axis perpendicular to the orientation direction of the PL layer). These emissions are measured at the same single wavelength using unpolarized excitation light at a single wavelength somewhere within the emission spectrum and preferentially at an emission maximum.

DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
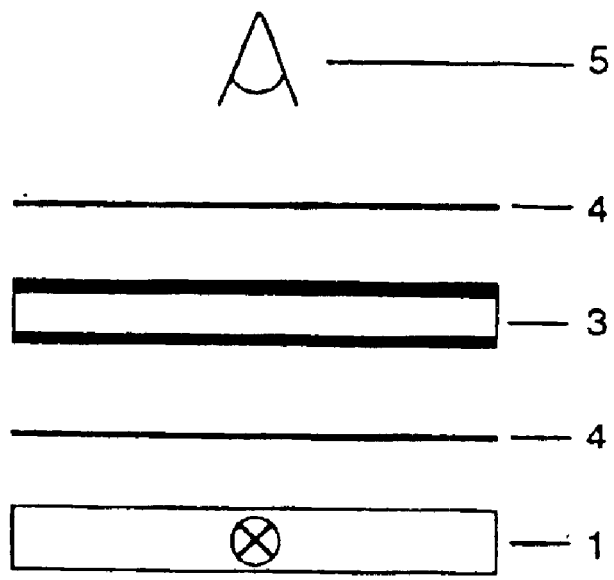
FIGS. 1A, B are schematic structures of a conventional liquid crystal display (LCD) device.
Figure 1:
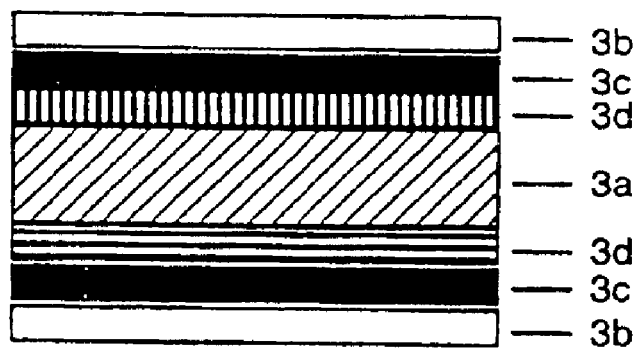
Figure 2:
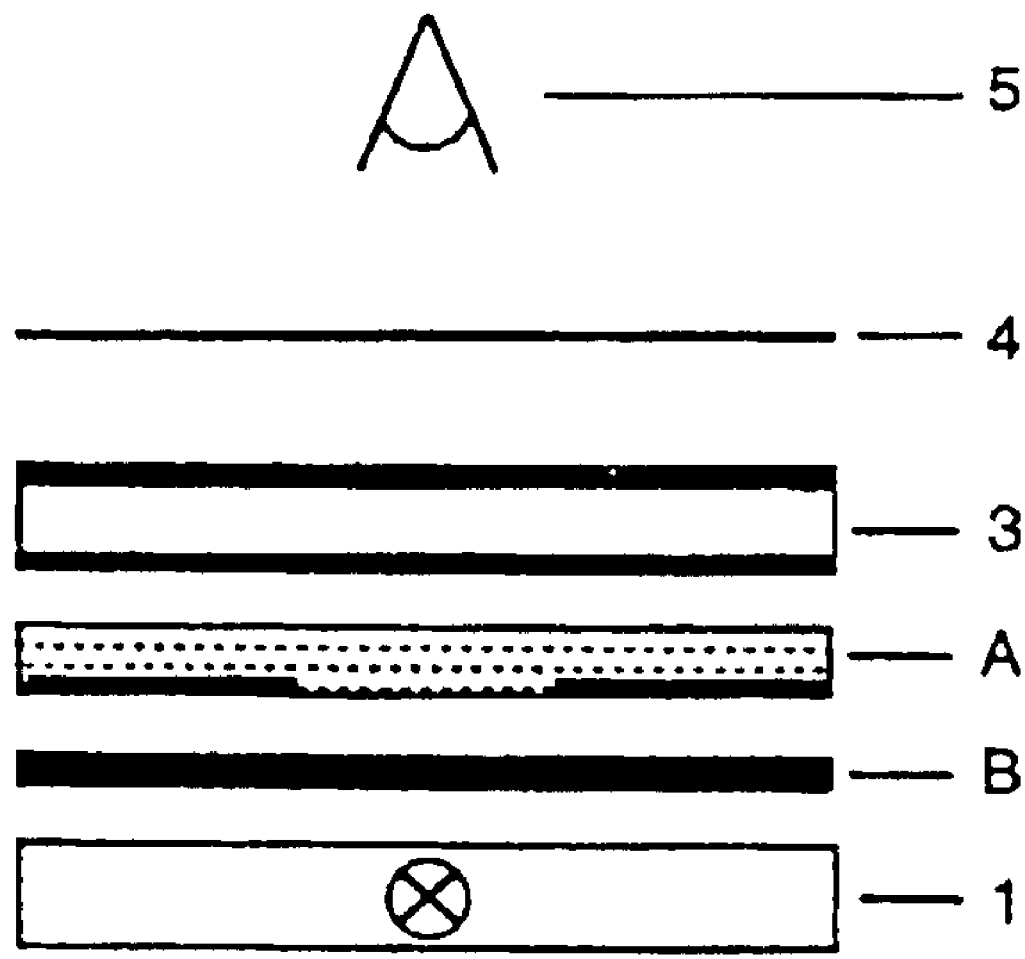
FIG. 2 is a schematic structure of a display device according to an embodiment of German patent No. DE 2640909 C2.

The present invention is based on our surprising finding that display devices comprising at least one thin highly polarized PL layer are of a very high brightness and very high contrast, can have an excellent viewing angle, and can be configured to exhibit one or more colors that cover the entire visible portion of the spectrum of light useful for display applications. Most importantly, we found that the polarized PL layers should be thin and should exhibit a dichroic ratio in absorption that exceeds a minimum value, and should be polarized in their emission, or not, depending on the particular device configuration, in order to yield displays with the above desired characteristics.

The Polarized Photoluminescent Layer

The polarized PL layers useful in the present invention are characterized in that they absorb light in a highly polarized fashion and, after photoexcitation, they emit light that can be polarized or not. Such polarized PL layers can comprise one or more different substances, and can be manufactured by a wide variety of methods. The substances to be selected and fabrication methods that are most appropriate for the desired application form and color or colors of the display device are known from the state of the art. To avoid any replication from the known prior art, all the below mentioned literature references in relation to appropriate substances and methods of fabrication are herewith included in and part of the present invention.

The polarized PL layers, for example, may comprise one or more inorganic materials, such as GaInP-compounds (P. J. Pearah et al. Appl. Phys. Lett. Vol. 62, pp. 729–731), ZnSe (L. Worschech et al., "Blue Laser Light Emitting Diodes", Int. Symp., pp. 421–424, Eds. A. Yoshikawa, Tokyo, Japan, 1996), or tris(bipyridine)ruthenium(2+) intercalated cadmiumthio-hypophosphazene (E. Lifshitz et al., J. Phys. Chem. Solids, Vol. 52, pp. 1081–1086 (1991), or inorganic oligomers or polymers, or mixtures thereof.

Alternatively, the polarized PL layers useful in the present invention may comprise one or more organic species, such as small molecules, oligomers or polymers, or mixtures thereof or of organic and inorganic materials. Representative examples of small organic species and oligomers useful in the present invention can be found in, for example, "Organic Luminescent Materials" by B. M. Krasovitskii et al. (VCH Verlag., Weinheim, 1988).

Oligomers and polymers that are useful in the present invention include, but are not limited to those molecules that comprise one or more of the following moieties:

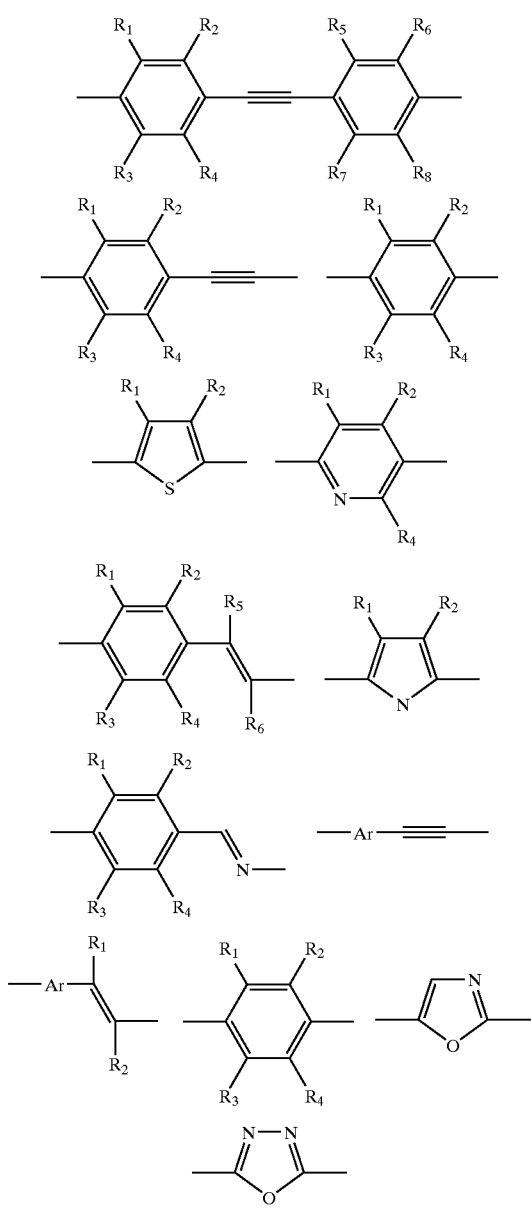

where Ar is an arylene group including, but not limited to the following moieties:

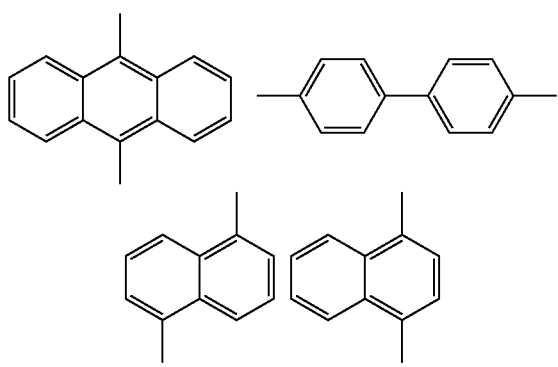

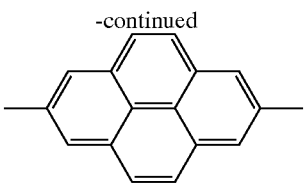

and where $R_1$–$R_6$, are the same or different at each occurrence, and are composed of, for example, but not limited to: H, alkyl, alkyloxy, $CF_3$, CN, phenyl, $NH_2$, NH-alkyl, $N(alkyl)_2$, $NO_2$ and $Si(allyl)_3$.

Methods of Preparation of the Polarized Photoluminescent Layer

Polarized PL layers for use in the present invention can be made, for example, by incorporation of appropriate photoluminescent, low molecular weight organic molecules or inorganic matter in oriented polymers, prior to or after the orientation step (J. J. Dekkers, Chem. Phys. Lett., Vol. 19, pp. 517–523 (1973); L. V. Natarajan et al., Chem. Phys. Lett., Vol. 95, pp. 525–528 (1983); R. Neuert et al., Colloid & Polymer Science, Vol. 263, pp. 392–395 (1985): M. van Gurp et al., J. Polym. Sci., Part B. Polymer Physics, Vol. 26, pp. 1613–1625 (1988): Y. Dirix et al., Macromolecules, Vol. 30, pp. 2175–2177 (1997); U.S. Pat. No. 4,56,953).

Another beneficial method for the fabrication of the polarized PL layers for use in the present invention is tensile orientation if the selected photoluminescent material is a ductile polymer (C. Zhang et al., Synth. Met. Vol. 46, pp. 235–242 (1992): J. Moulton et al., Polymer, Vol. 33, pp. 2340–2348 (1992); P. Dyreklev et al., Adv. Mater., Vol. 7, pp. 43–44 (1995): U. Lemmer et al., Appl. Phys. Lett., Vol. 68 pp. 3007–3009 (1996), or a ductile blend of photoluminescent polymers or oligomers or small molecules with carrier polymers (U.S. Pat. No. 5,204,038; J. Moulton et al., J. Polym. Sci., Polym. Phys. Ed., Vol. 30, pp. 871–878 (1992)).

Alternatively, polarized PL layers useful in the present invention can be fabricated by oriented growth of photoluminescent materials onto orienting substrates, such as, for example, oriented poly(tetrafluoroethylene) (U.S. Pat. No. 5,180,470; K. Pichler et al., Synth. Met., Vol. 55–57, pp. 454–459 (1993); D. Fenwick et al., J. Mater. Sci. Vol. 31, pp. 915–920 (1996); R. Gill, et al., Adv. Mater., Vol. 9, pp. 331–334 (1997)), polyimides (G. Lüssem et al., Liq. Cryst., Vol. 21, pp. 903–907 (1996) or inorganic surfaces (P. J. Pearah et al., Appl. Phys. Lett. Vol. 62, pp. 729–731 (1993)).

Direct deposition through friction of photoluminescent materials (N. Tanigaki et al., Thin Solid Films, Vol. 273, pp. 263–266 (1996) or rubbing of photoluminescent materials, or the Langmuir-Blodgett technique (V. Cimrová et al., Adv. Mater., Vol. 8, pp. 146–149 (1996): A. Bolognesi et al., Adv. Mater., Vol. 9, pp. 121–124 (1997); M. Hamaguchi et al., Appl. Phys. Lett., Vol. 67, pp. 3381 (1995)) may also be employed for the fabrication of the polarized PL layers for use in the present invention. Other techniques, such as photo-induced alignment, alignment in electric, magnetic or flow fields of photoluminescent substances that yield highly polarized PL layers may also be employed.

Characteristics of the Polarized Photoluminescent Layer

Unlike the photoluminescent polymer plates of the prior art which, of need, are thick, the polarized PL layers according to the present invention are thin, and have a thickness of less than about 1 mm, preferably of less than about 300 μm, and more preferably of less than about 50 μm. Most preferably, the thickness of the polarized PL layers according to the present invention is less than about 10 μm.

The polarized PL layers according to the present invention have a minimum thickness of at least 1 nm.

The dichroic ratio in absorption as defined above of the thin, polarized PL layers for use in the present invention is more than about 5. Preferably, the dichroic ratio is more than 10, and most preferred are dichroic ratios of more than 20.

In the particular display configurations (see below) that optimally function with polarizer PL layers according to the present invention that are characterized by a high degree of polarization in their emission, the dichroic ratio in emission as defined above, is more than about 5. Preferably, the dichroic ratio is more than 15, and most preferred are dichroic ratios of more than 35.

The polarized PL layers for use in the present invention may be homogeneous and continuous, and may be structured or patterned, and may comprise multiple individual elements, zones or pixels, or any array thereof, provided, however, that the dichroic ratio of the polarized PL elements are of the above minimum dichroic ratio. Stacks of such polarized PL layers, for example for use in multiple color displays, are also included in the present invention.

Device Structures

In the display devices according to the present invention, both light from the light source employed for photoexcitation of the polarized PL layer, and light emitted from the exited polarized PL layer may be switched. Some of the relevant basic principles of the display devices according to the present invention and preferred embodiments, many of which may include either one of these switching modes, are presented hereafter.

Figure 3:
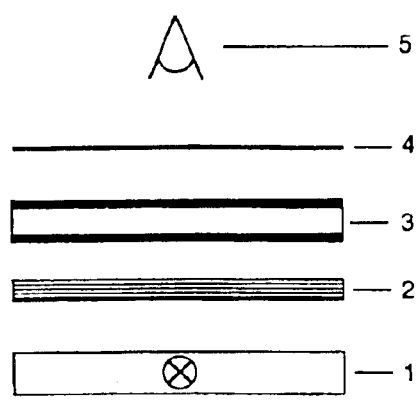
FIGS. 3A–G are schematic structures of possible display devices according to embodiments of the present invention.
Figure 3:
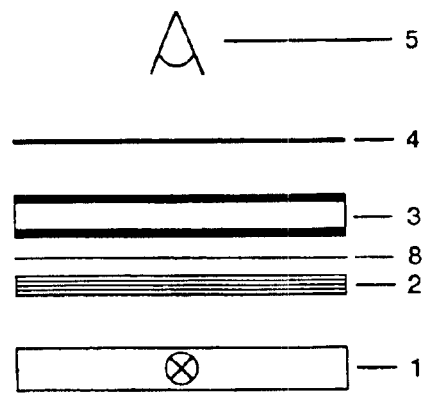
Figure 3:
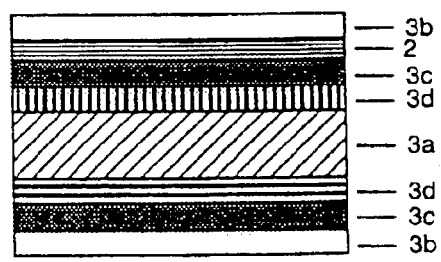
Figure 3:
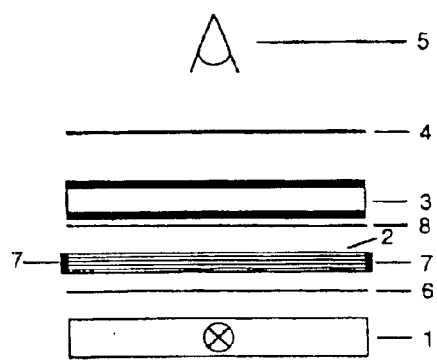
Figure 3:
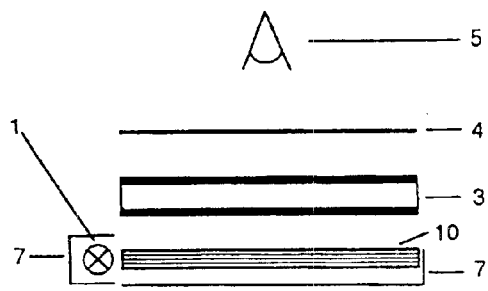
Figure 3:
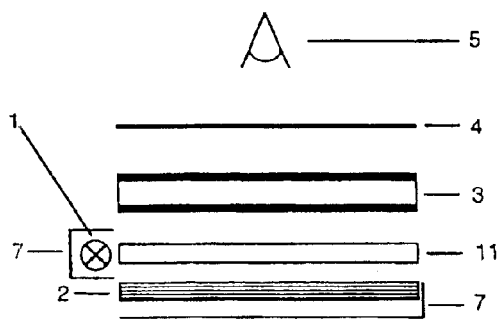
Figure 3:
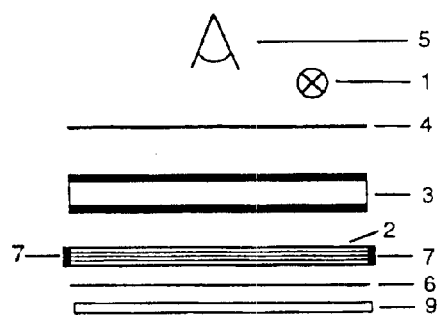

First presented are embodiments of display devices in which the light emitted from the polarized PL layer is switched. In this case, the predominantly relevant polarization characteristic of the polarized PL layer is a high degree of polarized emission. In FIG. 3A, an exploded schematic view of a possible device configuration is given. The arrangement, when viewed from the position of the viewer (5) consists of a linear polarizer (analyzer) (4), an electrooptical light valve (3), the polarized PL layer (2) and a light source (1). Light emerging from the light-source (1) is at least partially absorbed in the polarized PL layer (2), from where subsequently polarized light is emitted. The portion of the light emitted from the polarized PL layer (2) in the direction of the electrooptical light valve (3) either passes the combination of light valve (3) and the polarizer (4) (switching state "bright") or is blocked by the combination of light valve (3) and the polarizer (4) (switching state "dark"). It should be noted, that the switching states "bright" and "dark" not necessarily coincide with above referred electric switching states "on" and "off", respectively, and the correlation also depends on the precise device configuration. The polarizer (4) is oriented such that it allows transmission of the light emitted by the polarized PL layer (2) in its polarization direction when the switching state of the light valve (3) is "bright". According to the present invention, maximum contrast is obtained when (i) the polarized PL layer (2) is characterized by a high dichroic ratio for PL emission, and (ii) the portion of light visible to the human eye that is emitted by the light source (1), but not absorbed by the polarized PL layer (2), and thus exits the device in the direction of the viewer, is minimal. This can be achieved by different means. One example comprises a light source (1) which is characterized by an emission spectrum such that all the light emitted by the light source is absorbed by either the polarized PL layer (2), the light valve (3) or the polarizer (4). The use of a UV-light source can be particular advantageous in this context, since the portion of light that is emitted by the light source (1), but not absorbed by the polarized PL layer (2), is in this case usually absorbed by components (2), (3), or (4). Alternatively, a bicolor device can easily be created when (i) the polarized PL layer (2) is characterized by a high dichroic ratio for PL emission, and (ii) the portion of light visible to the human eye that is emitted by the (for example blue light emitting) light source (1) but not absorbed by the polarized PL layer (2), and thus in one switching state exits the device in the direction of the viewer, is maximal.

An alternative example of a possible display device according to the present invention is shown in FIG. 3B in an exploded schematic view. Here, an additional means (8) (for clarity called "cut-off-filter"), which blocks the light that is emitted by the light source (1), but is not absorbed by the polarized PL layer (2), is positioned in the device between the polarized PL layer (2), and the viewer (5), preferably between the PL layer (2) and the light valve (3). This cut-off-filter (8) preferably is a wavelength-selective mirror which reflects the light generated by the lamp that was not absorbed by the polarized PL layer, but transmits the light emitted by the polarized PL layer or can, for example, be a high-pass filter or a polarizer or a combination thereof. Another preferred arrangement is the use of a combination layer of the polarized PL layer (2) and the cut-off-filter (8), for example, by doping or coating the polarized PL layer (2) with an additional dye.

The display device can also be arranged, such that the polarized PL layer (2) is placed inside the electrooptical light valve (3), such as shown in an exploded schematic view in FIG. 3C. In order to keep the switching voltages low, the polarized PL layer (2) is positioned between the transparent electrode (3c) and carrier plate (3b). Particular advantages of this arrangement are a more compact device and an enhanced viewing angle, as well as the absence of parallax in a pixellated structure. In addition, the polarized PL layer (2) according to the present invention, may function also as orientation layer (3d in FIG. 3C) for the liquid crystalline material.

To define the operation of the devices that can be built, a definition is given of the several axes that will be used:

The polar axis of the polarizer is the direction of the electrical field vector of the light that is transmitted by the polarizer films. The polarized PL layer axis is the direction of the electrical field vector of the light emitted by the polarized PL layer and which commonly, but not necessarily, is parallel to the direction of the electrical field vector of the excitation light that is absorbed. When these layers are placed in series with their axes crossed, the polarizer film will absorb the light generated by the polarized PL layer. In contrast, when placed parallel, the polarizer film transmits the light generated in the polarized PL layer.

For the above given configuration (except display devices comprising the polarized PL layer (2) inside the electrooptical light valve (3) as shown in FIG. 3C, arranged such that light emerging from the light source first passes the liquid crystal layer (3a) before exciting the polarized PL layer (2)), the liquid crystal cell is optimized to switch light of the wavelength of the light that is emitted by the polarized PL layer. The transmission is controlled by the axes of the polarized PL layer and the polarizer film, the switching state of the device field-off or -on state, the wavelength of the emitted light, the cell thickness and the optical properties of the LC material. For some LC effects the set of parameters are given below:

ECB effect: When the polar axis of the polarizer and the polarized PL layer axis are crossed and the liquid crystal orientation is at 45° with these axes, the maximum transmission ("bright" state) in the field-off state depends on the thickness of the cell d, the birefringence of the liquid crystal Δn and the wavelength λ and occurs at $$\frac{d\Delta n}{\lambda} = \frac{k}{2} \text{ with } k = 1, 3, 5, 7, \ldots$$

In that case, the polarized light transmitted by the LC layer remains linearly polarized, but the polarization axes is rotated over 90°. In a preferred cell configuration k is 1, which, optimized for a wavelength of 510 nm (green) and a commercial LC material Licrilite ML1001 (Merck Ltd.) with a Δn=0.122 at the same wavelength, means that the optimum cell thickness is 2.1 μm.

When an electrical field is applied, the effective Δn becomes smaller and the transmitted light becomes elliptically polarized. The polarizer film will now absorb part of the light, an effect that may be applied to generate intermediate tones. In the fully addressed state, where all LC molecules are aligned along the electrical field lines, dΔn/λ becomes 0 and the light is fully extinguished by the polarizer ("dark" state).

In another configuration, the axes of the polarizer and the polarized PL layer are chosen to be parallel, by which a dark field-off state and a bright and colored field-on state is obtained. In again another configuration the LC molecules have a negative dielectric anisotropy and are aligned perpendicular to the electrode surface by a surfactant type of alignment layer (e.g. lecithin). In the field-off state the LC film has a low birefringence for the passing light and a dark state is formed in case of crossed axes of the polarized PL layer and the polarizer film, respectively. When the field is switched on, the LC film becomes birefringent above the transition voltage, and the polarizer transmits the by the polarized PL layer emitted light.

TN effect: In the case that a multi-color display is made, containing pixel elements with basically three different polarized PL layers emitting blue, green and red light (see below), the TN effect is preferred because of its high contrast and its relative wavelength independence. This enables effective switching of the three colors with one uniform cell thickness. The relative intensity ($I_t$) of the light transmitted by the TN with the axes of the polarized PL layer and the polarizer film parallel and the orientation at one boundary of the LC film parallel with the axis of the polarized PL layer is described by $$I_t = \frac{\sin^2[\frac{\pi}{2}]\sqrt{1+\left(\frac{2d\Delta n}{\lambda}\right)^2}}{1+\left(\frac{2d\Delta n}{\lambda}\right)^2}$$

Figure 4:
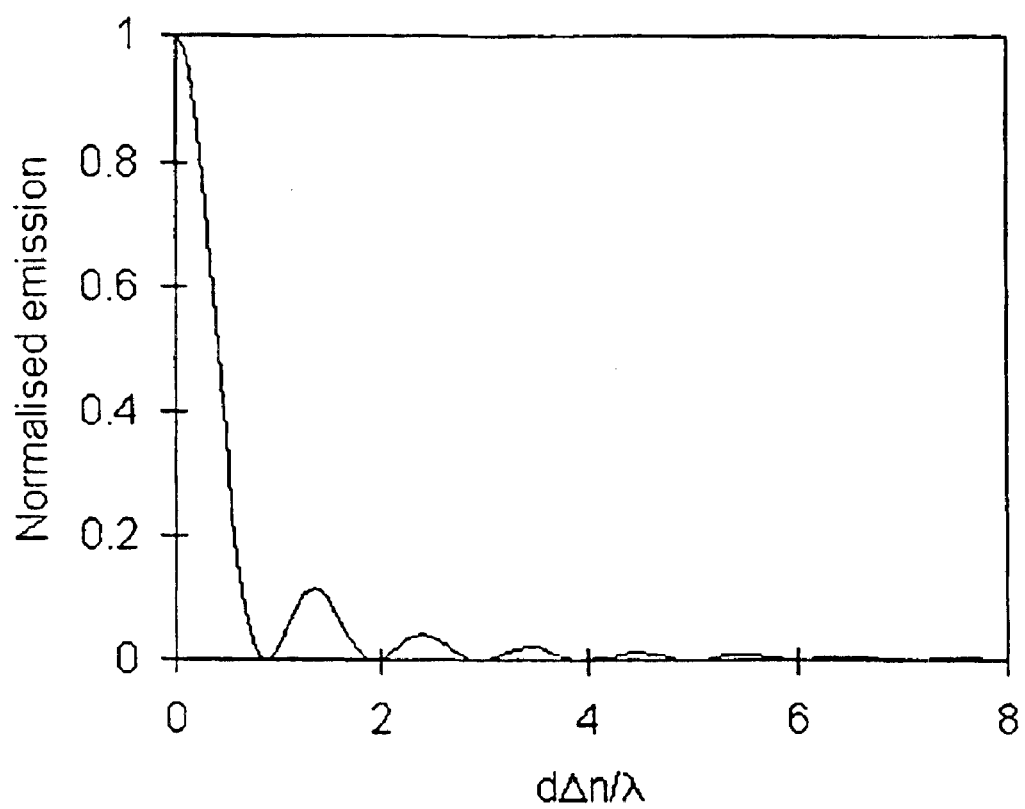
FIG. 4 is a plot of normalized emission versus the product of the thickness (d) and birefringence ($\Delta n$) divided by the wavelength ($\lambda$).

When $I_t$ is plotted versus dΔn/λ, in which Δn is wavelength dependent because of the refractive index dispersion, this yields the curve drawn in FIG. 4.

For a preferred embodiment the unaddressed state the parameters of the TN cell are chosen such that on the average for the wavelengths of interest dΔn/λ are close to the first minimum, i.e. dΔn/λ=1/2√3. In this TN cell configuration, optimized for a wavelength of 510 nm (green) and a commercial LC material Licrilite ML1001 (Merck Ltd.) with a Δn=0.122 at the same wavelength, the optimum cell thickness is 3.6 μm. This means that the cell is perfectly black in the field-off state for 510 nm light and that it has a normalized emission of 0.08 for 440 nm light (blue) and of 0.06 for 620 nm light (red). Both values are sufficiently low to give the display a black appearance for all three colors.

Also at the TN display the axes of the polarized PL layer and the polarizer film can be chosen perpendicular. In that the inverted curve in FIG. 4 is obtained with a "bright" state, i.e. an emissive colored state for each pixel element and a white state for the integrated performance of a collection of neighboring pixels, in the field-off state and a black appearance in the field-on state.

For many possible devices structures, including the examples given in FIGS. 3A, 3B and 3C the use of a dichroic mirror (6), which is positioned between the polarized PL layer (2) and the light source (1), is advantageous (FIG. 3D for an exploded schematic view). This dichroic mirror (6) is characterized in that it lets the light emitted by the light source (1) pass and reach the polarized PL layer (2), but reflects the portion of light which initially is emitted by the polarized PL layer (2) in a direction away from the viewer (5) and thus redirects this portion of light in the direction towards the viewer (5). The polarized PL layer (2) might, in addition, be mirrored (7) in order to prevent the exit of light in undesired directions and might be provided with light emergent or exit windows such as described in German patent No. DE 2640909 C2, to further concentrate the emission of light to preferred sites, and thus increase the device efficiency with respect to contrast and brightness.

Another example for a preferred device structure is given in an exploded schematic view FIG. 3E. Here, the polarized PL layer functions as a polarizing photoluminescence waveguide (10), in which the light emitted by the light source (1) is waveguided until it is absorbed and re-emitted by the photoluminescent moieties. The device is preferably fitted with a dichroic mirror (6) as outlined above, and with mirrors (7) and light emergent or exit windows as outlined above.

Alternatively, a conventional waveguide-based backlight system is used (cf. FIG. 3F) in which the polarized PL layer (2) is arranged such that it is behind the waveguide (11) when viewed from the direction of the viewer (5). Preferably, the waveguide (11) is characterized in that it emits the light guided from the light source (1) preferably into the direction of the polarized PL layer (2), and that it allows the transmittance of the polarized light emitted from the polarized PL layer (2). The polarized PL layer (2) in the display device according to FIG. 3F may additionally function as a polarized scatterer or diffuser.

Yet another example of a preferred device structure is given in an exploded schematic view FIG. 3G. Here, ambient light (1) is used for illumination, entering the device in a direction from the viewer to the device, with the polarized PL layer (2) being void of mirrors on its two large faces (oriented towards the viewer and away from the viewer), but preferably mirrored (7) at all other sides. Behind the polarized PL layer (2) (viewed from the direction of the viewer), preferably a dichroic mirror (6) is used, which only reflects the polarized light emitted by the polarized PL layer (2). The ambient light which is not absorbed by the polarized PL layer (2), is absorbed in a nonreflective layer (9).

Figure 5:
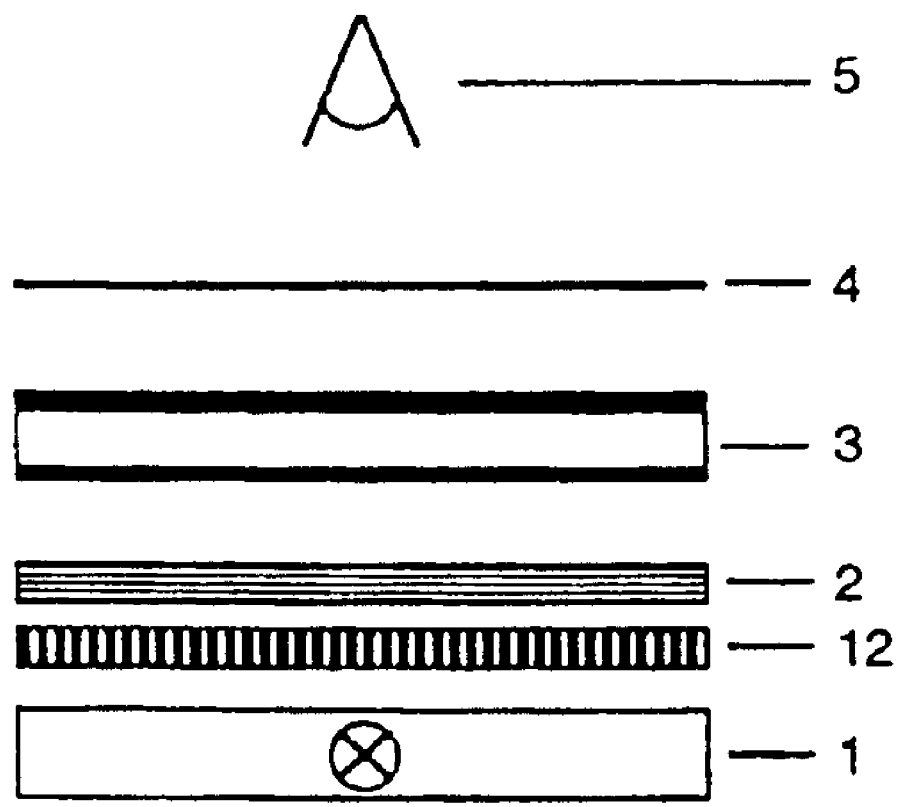
FIG. 5 is a schematic structure of a possible display device according to another embodiment of the present invention that comprises two polarized photoluminescent layers.

Still another preferred arrangement according to the present invention is the use of two polarized PL layers (2, 12), for example shown in an exploded schematic view FIG. 5. In this particular embodiment the two polarized PL layers (2, 12) are characterized in that they have different emission spectra. These two polarized PL layers (2, 12) may be arranged behind each other, when viewed from the direction of the viewer (5), positioned in the same place as the one polarized PL layer (2) in the above described arrangements.

These two polarized PL layers (2, 12) may be oriented such that their polarization directions for emission are perpendicular to each other. Thus, the combination of light valve (3) and the polarizer (4) no longer switches from bright to dark but lets the emitted polarized light from polarized PL layer (2) pass in the one switching state and the emitted polarized light from polarized PL layer (12) pass in the other switching state, enabling the production of a multicolor display device. Alternatively, the two polarized PL layers (2, 12) may be oriented such that their polarization directions for emission are at an angle different from 90° to each other. The latter arrangement enables switching between different multiple colors. In related embodiments, the two polarized PL layers may be separated by the electrooptical light valve, or may be placed inside the electrooptical light valve (cf. FIG. 3C).

Figure 6:
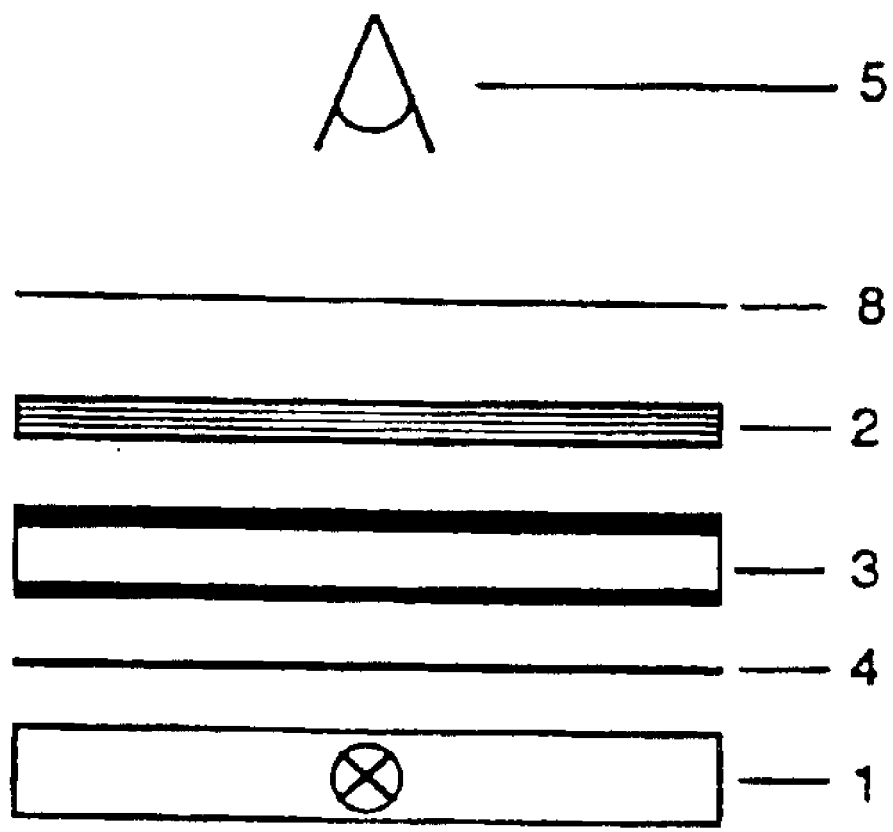
FIG. 6 is a schematic structure of a possible display device according to another embodiment of the present invention.

Next presented is an embodiment of a display device in which light from the light source employed for excitation of the polarized PL layer is switched. In this case, the predominantly relevant polarization characteristic of the polarized PL layer is a high degree of polarized absorption. In this embodiment, the emission of unpolarized light from the polarized PL layer can be beneficial. In FIG. 6 an exploded schematic view of a possible device structure is shown. Here, the display device is arranged, such that the polarized PL layer is positioned between the electrooptical light valve (3) and the viewer. Of course, in this case the polarizer (4) must be active in the wavelength region of the excitation wavelength. The particular advantage of switching this wavelength is that the LC cell can be optimized for a single wavelength regime (i.e. the excitation wavelength, for example UV or blue) which leads to higher contrast values. Another particularly important advantage is that, in this case, the viewing angle is determined by the emission of the polarized PL layer and has become independent of the viewing angle-sensitive LC effects.

In a typical device, for example, 365 nm light is used for the excitation of the polarized PL layer (2). When use is made of the TN effect to switch the 365 nm light and a commercial UV stable LC material Licrilite ML1001 (Merck Ltd.) with a $\Delta n=0.149$ at the same wavelength, the optimum cell thickness is 2.1 $\mu$m.

As in this set-up the polarized PL layer only absorbs light with its E-field parallel to the axis, the opposite polarization is transmitted. In order to avoid that this light reaches the viewer's eye, the previously described cut-off filter (8) may be used. In a preferred embodiment two of such layers are present where the order is coming from the backlight into the viewer's direction, a wavelength-selective mirror and a high-pass filter, respectively. In another preferred embodiment the high-pass filter also contains other absorbing species which have a low absorption at the emission wavelength or wavelengths, but absorb visible light outside that wavelength region, thus even more improving the contrast by absorption of the light coming from the surroundings.

In order to make a multi-colored image, an array of at least three different polarized photoluminescence pixel elements (for example red, green and blue: R, G, B) may be applied at or within the LC cell. The LC material within each pixel element can be addressed separately by an active or a passive electrode matrix. In a preferred embodiment, the polarized PL pixel elements are applied within the cell, for instance in between the transparent carrier plate and the transparent electrode. In another preferred embodiment the polarized PL pixel elements are applied, outside the cell. In that case, it is preferred to apply the polarized PL layer at the viewers side of the cell and to use collimated light in order to avoid parallax caused by the relatively large distance between the emitting polarized PL layer and the electrooptic light valve. In another preferred embodiment the polarized PL pixels are applied in the cell near the LC film to avoid parallax and at the side of the viewer in order to improve the display on its viewing angle characteristics. Emission of white light from the display device is obtained by a balanced emission of the R, G and B pixel elements. Colors are generated by balanced mixing of the light emission of the various pixel elements. In this case. UV light of, for instance. 365 nm can be used to excite the polarized PL layers. When the photoluminescence efficiencies differ for the different colors, the appropriate white point can be obtained by adjusting the thickness of the polarized PL pixels, the concentration of the active photoluminescent moieties or the surface areas of the pixel elements.

In another pixillated display configuration three different pixel elements are made, two of them are provided with a red and a green emitting polarized PL layer, respectively, that are exited by blue light. The third pixel element is provided with a neutral polarizing filter. In this case blue light is used from a backlight source. R and G are obtained from the polarized PL layers, B from the third pixel element by switching it to the "bright" or to the "dark" state. In a preferred embodiment the blue pixel elements are not covered separately by the polarizer, but a polarizer film is used which covers all pixel elements. The axis of the polarizer is parallel to that of the polarized PL layers. In the above embodiment of the present invention, in the production of the patterned pixel elements, one lithographic or printing step is avoided. In addition, the contrast of the display device is further enhanced because the top polarizer absorbs that part of the light that otherwise would be reflected from the viewer's side.

In order to avoid the problem of cross talk between the different colored polarized PL pixel elements, small absorbing elements can be placed in between them. It is common practice in the art that in conventional liquid crystal displays this is accomplished by evaporation or sputtering of, for example, a chromium pattern. This technique also is useful for embodiments of the present invention. Another advantage of embodiments of the present invention in which light from the light source employed for excitation of the polarized PL layer is switched, is that the black matrix can consist of organic material comprising an absorbing dye for this particular excitation wave length. This absorbing matrix can be applied using, for example, simple printing or lithographic techniques.

Figure 7:
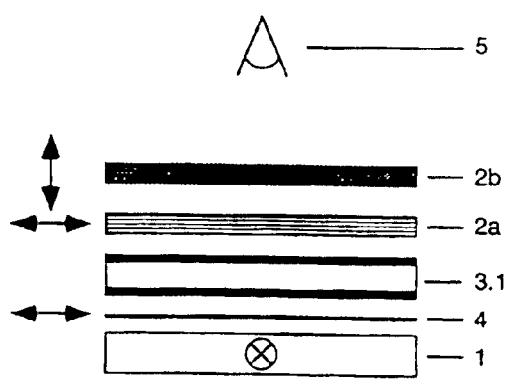
FIGS. 7A–D are schematic structures of possible display devices according to yet other embodiments of the present invention that comprises multiple polarized photoluminescent layers and multiple electrooptical light valves in a stacked configuration.
Figure 7:
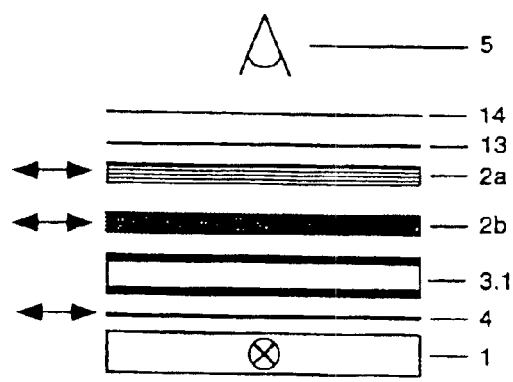
Figure 7:
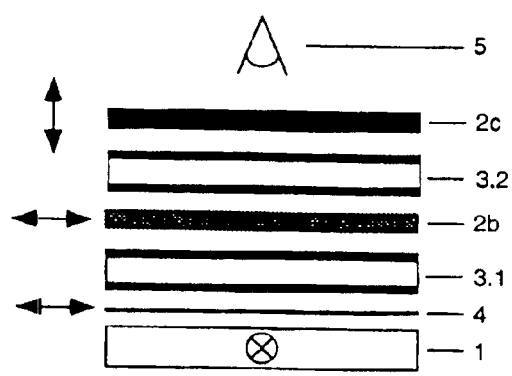
Figure 7:
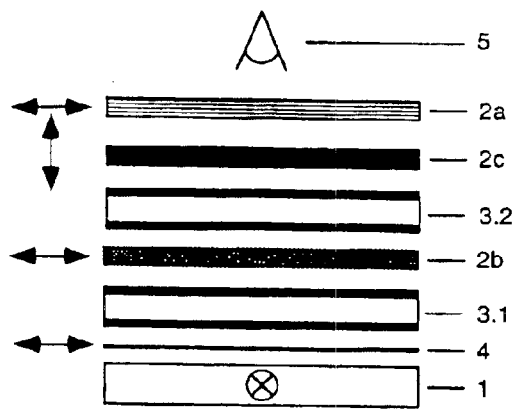

One pixel element is able to generate multiple colors if several polarized PL layers are combined as already shown above. In another preferred embodiment according to the present invention, two polarized PL layers are placed on top of each other, i.e. in a stacked fashion, with their axes perpendicular as shown in an exploded schematic view for a blue (2a) and a red (2b) emissive polarized PL layer in FIG. 7A. The arrows in this FIG. 7 indicate the direction of the axes. The TN-type electrooptical light valve (3.1) controls the direction of the polarization of the excitation light. In the two extreme switching states, either the blue polarized PL layer (2a) is excited and emits blue light (switching state "off"), or the red polarized PL layer (2b) is excited (switching state "on") and emits red light. At intermediate voltages the linearly polarized incident light is converted into elliptical polarized light, exciting both polarized PL layers (2a and 2b) of which the mixed color of the combined emission can be tuned by the voltage over the TN-type electrooptical light valve (3.1).

Also, angles between the axes of the polarized PL layers other than 90° are possible in order to create special effects, or to combine, for instance, three different polarized PL layers. In that case the optical retardation of the polarized PL layer itself should also be accounted for, which might change the state of polarization of transmitted light.

In some specific manufacturing technologies for the polarized PL layers. e.g. epitaxial growth at oriented surfaces, it might be more preferable to arrange the stack of polarized PL layers with their axes parallel rather than perpendicular to each other. A preferred embodiment according to the present invention is shown in an exploded schematic view in FIG. 7B. In this arrangement, a combination of a dichroic mirror (14) which is reflective, for example, in the UV range and transmissive in the visible regime, and a quarter wave optical retardation film (13) can be utilized to address both colors separately. In the switching state "on", UV light—in this example—from the light source (1) and polarized by a UV polarizer, i.e. a polarizer active in the UV regime (4), excites the red polarized photoluminescence layer (2a), while in the switching state "off" this polarized UV light is transmitted by the red polarized PL layer (2a) and also by the blue one (2b). However, upon reflection at the dichroic mirror (14) the polarization of the UV light is rotated and becomes absorbed and converted by the blue polarized PL layer (2b).

Another example of a preferred embodiment according to the present invention that allows display of mixed colors, intermediate tones and a dark state, is shown in an exploded schematic view in FIG. 7C. In this arrangement, different polarized PL layers (2b, 2c) are addressed by separate, for example. TN-type electrooptical light valves (3.1, 3.2). This configuration allows for a number of different possibilities, of which in the following two examples are given. i) The first example includes the use of a UV light source (1) and also makes use, as discussed for various examples before, of a cut-off filter (not shown in the figure) between the green polarized PL layer (2c) and the viewer (5) that prevents the exit of UV excitation light in the direction of the viewer. Possible switching states and colors as observed by the viewer (5) are then:

| Situation # | Electrooptical light valve (3.1) | Electrooptical light valve (3.2) | Observation by viewer (5) |
|---|---|---|---|
| 1 | Field on | Field off | Red emission |
| 2 | Field off | Field on | Green emission |
| 3 | Field off | Field off | No emission (dark) |

In case the arrangement does not include a cut-off-filter, and a blue light source (1) is combined with polarized PL layers (2b, 2c) that are characterized in that they can be excited by the blue light emitted by the light source (1), possible switching states and colors as observed by the viewer (5) are then:

| Situation # | Electrooptical light valve (3.1) | Electrooptical light valve (3.2) | Observation by viewer (5) |
|---|---|---|---|
| 1 | Field on | Field off | Red emission |
| 2 | Field off | Field on | Green emission |
| 3 | Field off | Field off | Blue emission |

The benefit of the above embodiment of the present invention is that all three principal colors are generated with one pixel element, which leads to a display with an improved brightness because the whole pixillated surface can be used to create a colored image. Intermediate tones and dark can be created in this configuration by a third TN electrooptical light valve and an additional polarizer (not shown in the figure), both positioned between the polarizer (4) and the light source (1), which modulates the intensity of the blue light.

In yet another embodiment the double cell configuration is combined with a stack of polarized PL layers (2a, 2b, 2c) with crossed axes as shown in FIG. 7D. Possible switching states and colors as observed by the viewer (5), when, for example a UV light source (1) is used, are then:

| Situation # | Electrooptical light valve (3.1) | Electrooptical light valve (3.2) | Observation by viewer (5) |
|---|---|---|---|
| 1 | Field on | Field off | Red emission |
| 2 | Field off | Field on | Green emission |
| 3 | Field off | Field off | Blue emission |

As above, intermediate tones and dark can be created in this configuration by a third TN electrooptical light valve and an additional polarizer (not shown in the figure), both positioned between the polarizer (4) and the light source (1).

Another electrooptical light valve concept, making use of the benefits of the polarized PL layers, is based on the so-called guest-host (GH) liquid crystal system. The use of a dichroic dye, added to the switching liquid crystal material, avoids the use of an additional polarizer or analyzer film. In a preferred embodiment, a dichroic dye absorbing in the wavelength region of the excitation wavelength is mixed with an ECB liquid crystal. The long axis of the dichroic dye organizes parallel to the liquid crystal molecules. The director axis of the liquid crystal is chosen to be parallel to the optical axis of the polarized PL layer. In the field-off state, one polarization direction of the excitation light becomes preferably absorbed by the dye and the polarized PL layer is not excited. In the field-on state, the LC film is completely transparent for the excitation light and the polarized PL layer emits light. In this embodiment only one polarization direction of the excitation light is used. Again, improvement of the light yield or brightness is obtained by adding a selective mirror which reflects in the wavelength region of the excitation light and transmits the emitted light.

Also in the case of a guest-host electrooptical light valve, double cell arrangements can be beneficially used. Hereto the excitation light with the polarization that is transmitted by the first guest-host cell/polarized PL layer combination, is switched by a second guest-host cell with its orientation axis perpendicular to that of the first one. On the top of the second guest-host cell, a polarized PL layer is positioned which emits light with a different wavelength than that of the first polarized PL layer. In this way, two colors can be generated with one pixel element, thus improving the brightness and the color saturation of the display.

In another embodiment the guest-host cells are placed on top of each other with their axes perpendicular. On top of these cells, the stack of polarized PL layers is positioned, also with their axes crossed. Each GH cell addresses one polarized PL layer of which the intermediate tone is controlled by the applied voltage over the cell. Bringing the GH cells in contact which each other has advantages with respect to cell manufacturing, electrical contacts and device thickness.

In yet another embodiment, a guest-host and a TN electrooptical light valve are combined. Here, the light that is transmitted by a first GH-electrooptical light valve/polarized PL layer combination is automatically polarized. This polarization can be utilized to switch the second polarized PL layer with a TN effect.

Embodiments of preferred display devices that comprise other electrooptical light valves, such as those based on, for example, super-twisted nematics, in-plane nematic and ferroelectrics, or combinations thereof, are also included in the present invention.

Furthermore, it is envisaged that, in preferred devices which comprise multiple polarized PL layers, light that is emitted from one polarized PL layer can be used for the excitation of another polarized PL layer leading to additional improvements and enhanced device characteristics.

It is envisaged that the display devices according to the present invention may optionally include one or more additional layers or elements including, but not limited to diffusers, color filters, scatterers, and/or prismated films. Also, scattering or reflecting polarizers might be used instead of absorbing polarizers to further enhance the brightness and efficiency of the devices according to the present invention.

In order to maximally benefit from the advantages set forth in the description of the present invention, the elements constituting the display devices should have photophysical characteristics, such as transmission, absorption and refractive index, that are optimized with respect to the emission wavelength and other optical characteristics of the polarized PL layers of the present invention, and also the light source, according to the principles well known to those skilled in the art of display device design and manufacturing.

With respect to the choice of the excitation wavelength, and more generally the light sources used in the present invention, the following considerations apply. First, the elements used in the display devices, notably the polarized PL layers, polarizers and electrooptical light valves should be maximally stable under excitation conditions. Hence, as certain high-energy UV radiation may adversely affect the stability of the above elements, a light source of a somewhat higher wavelength, for example in the range of about 370 to about 470 nm may be preferred. Second, in addition to the various device configurations outlined above, which are either backlit or illuminated with ambient light (FIG. 3G), within the scope of the present invention, devices are also contemplated that make use of both light sources, and that can be operated either under ambient or backlit illumination, or both.

The following examples are set forth to further illustrate the present invention and should not be construed as limiting the spirit or scope of the invention.

EXAMPLE A

Preparation of Photoluminescent Polymers

Polymers designated, respectively, O-OPPE, substituted with only linear alkyloxy side chains, and EHO-OPPE, derivatized with linear and sterically hindered alkyloxy groups in an alternating pattern are of the following chemical structures:

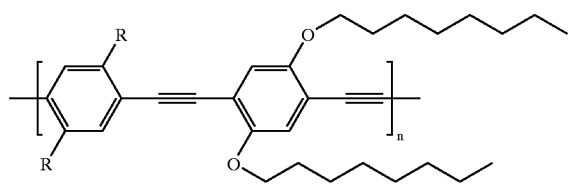

-continued

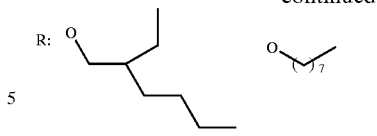

These substituted poly(phenyleneethynylene)s (PPEs) were synthesized according to the procedures described in Ch. Weder et al., Macromolecules, (1996) Vol. 29, p. 5157, and D. Steiger et al., Makromol. Chem. Phys., Rapid Comm., (1997) Vol. 18, p. 643. The O-OPPE sample had a number-average molecular weight, $M_n$, of 10,000 g mol$^{-1}$, and EHO-OPPE was of $M_n$=84,000 g mol$^{-1}$.

In addition, the polymer designated poly(1-methoxy-4-ethyl-hexyloxy-2,5-phenylenevinylene) (MEH-PPV), synthesized according to the procedure described in U.S. Pat. No. 5,204,038, was used. The MEH-PPV was of a weight-average molecular weight $M_w$=450,000 g mol$^{-1}$.

Preparation of Polarized Photoluminescent Layers

Thin blend photoluminescent layers with contents of 1 and 2%/w/w of PPE were prepared by casting a solution of the different PPEs (5 or 10 mg) and ultra-high molecular weight polyethylene (UHMW PE, Hostalen Gur 412, Hoechst AG) (0.5 g) in xylene (50 g) (dissolution at 130° C. after degassing the mixture in vacuum at 25° C. for 15 min.) into a petri-dish of 11 cm in diameter. The resulting gel layers were dried under ambient conditions for 24 h. These unoriented blend layers had a homogeneous thickness of about 70 $\mu$m. The layers were drawn at temperatures of 90–120° C. on a thermostatically controlled hot shoe to a series of different draw-ratios ($\lambda$=final length/initial length) that ranged from 10 to 80. Draw ratios were calculated from the displacement of distance marks printed on the films prior to drawing. The oriented layers had a thickness in the range from about 1 to about 10 $\mu$m.

In addition, thin blend layers with a content of 1% w/w of MEH-PPV were prepared by casting a solution of the MEH-PPV and ultra-high molecular weight polyethylene (UHMW PE, Hostalen Gur 412, Hoechst AG) in the identical manner as described above.

Preparation of Thick Photoluminescent Plates

For reference purposes, also thick photoluminescent plates with a content of 1% w/w of PPE were produced by first casting a solution of EHO-OPPE (20 mg) and high molecular weight polyethylene (HMW-PE, Hostalen GR 7255, Hoechst AG, $M_w$, of –400.000 g mol$^{-1}$) (2 g) in xylene (200 g) (dissolution at 135° C. after degassing the mixture in vacuum at 25° C. for 15 min.) into a petri-dish of 11 cm in diameter. The resulting gels were dried for 70 h at ambient. Subsequently, the obtained blend was collected, placed between two aluminium plates, fitted with 1 or 5 mm spacers, and melt-pressed in a hot press for 5 min at temperatures of 140–150° C. under a pressure of 3–5 metric tons to yield plates of a thickness of approximately 1 and 5 mm. One 5 mm thick plate was drawn at a temperature of 120° C. in an tensile-tester equipped with a thermostatic chamber, to yield an oriented plate of a draw-ratio of 3.6 and a thickness of 1.5 mm.

Characterization of Polarized Photoluminescent Layers and Plates

The anisotropic photophysical behavior of these oriented layers and plates was analyzed with polarized photoluminescence (PL) and polarized UV/Vis absorption spectroscopy. For the photophysical analysis, the polymer layers and plates were sandwiched between two quartz slides: silicon oil fluid was applied in order to minimize light scattering at the layer and plate surfaces. The dichroic ratios were measured as defined above.

PL spectra were recorded on a SPEX Fluorolog 2 (Model F212 I), using unpolarized light (350 nm) for excitation and a Glan-Thomson polarizer on the detector side.

UV/Vis absorption spectra were recorded on a Perkin Elmer Lambda 900 instrument, fitted with motor driven Glan-Thomson polarizers. Scattering effects were compensated in the absorption measurements by subtracting the spectra of pure UHMW PE films of comparable draw ratio and thickness.

Figure 8:
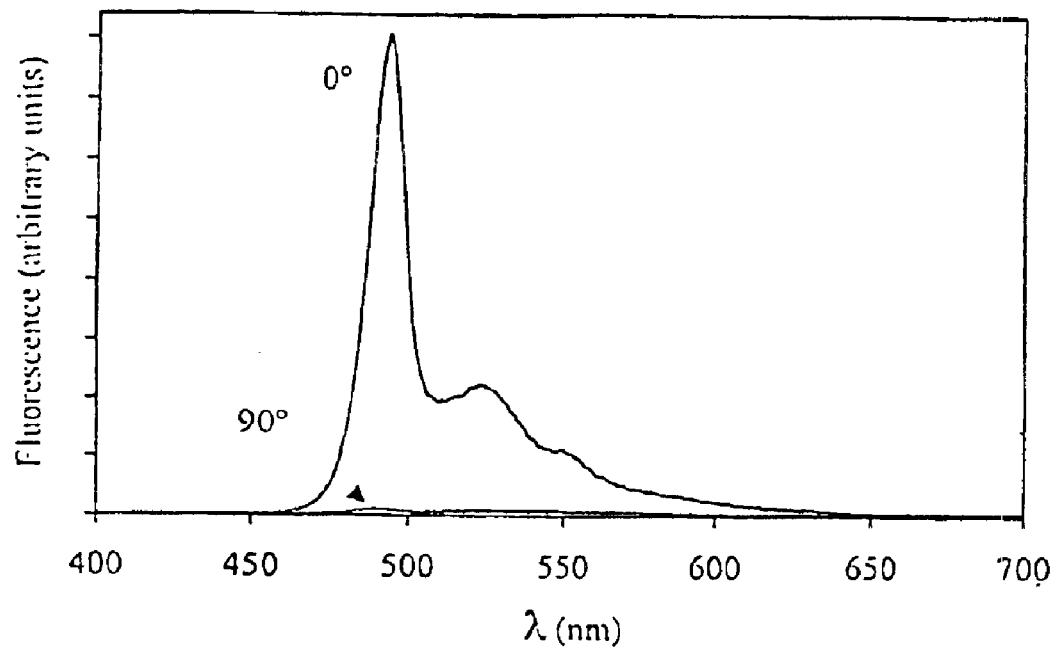
FIG. 8 displays the polarized photoluminescence spectra recorded for light emission parallel (0°) and perpendicular (90°) to the drawing direction of an oriented film (draw ratio $\lambda=80$) of 2 w/w % EHO-OPPE/UHMW-PE blends that was exited with unpolarized light.
Figure 9:
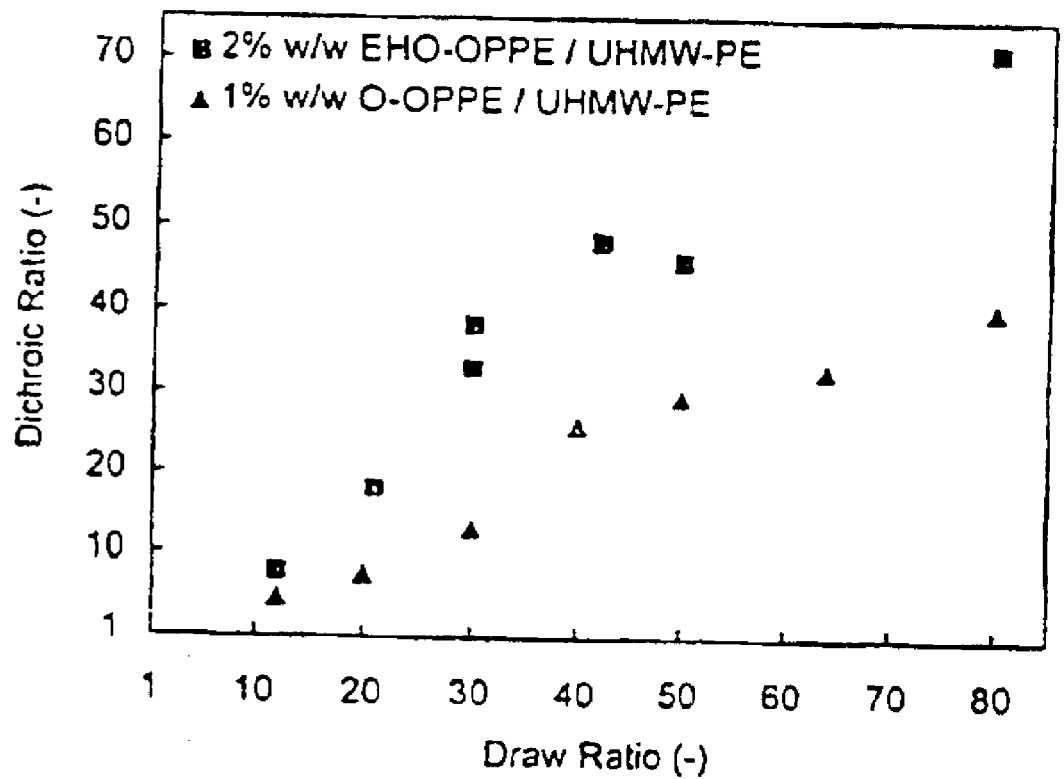
FIG. 9 displays a graph of the dichroic ratio measured in emission as a function of the draw ratio for films containing 1 or 2 w/w % PPE. (■) EHO-OPPE of a number average molecular weight $M_n$ of 84,000 g mol$^{-1}$; (▲) O-OPPE of $M_n$ of 10,000 g mol$^{-1}$.
Figure 10:
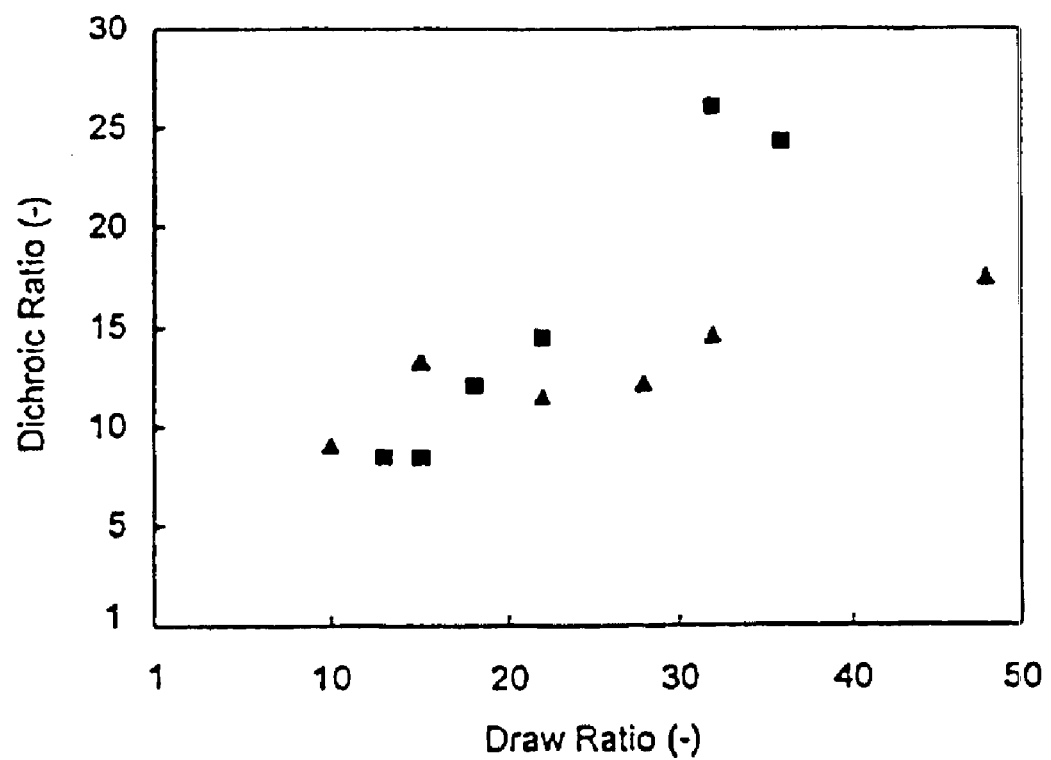
FIG. 10 displays a graph of the dichroic ratio measured in absorption as a function of the draw ratio for films containing 1 or 2 w/w % PPE. (▲) EHO-OPPE of a number average molecular weight $M_n$ of 84,000 g mol$^{-1}$ (■) O-OPPE of $M_n$ of 10,000 g mol$^{-1}$.

Highly-polarized absorption and emission were observed for the oriented layers, as visualized for emission in FIG. 8 for a layer containing 2% w/w of EHO-PPE with a draw ratio of 80. The polarized emission spectra of this particular layer show that this layer is characterized by a dichroic ratio, measured in emission, of 72. The dichroic ratio of this particular layer, measured in absorption, was 56. The influence of the draw ratio, the structure of the side chains, and the composition of the blends on the dichroic ratio measured in emission and absorption for PPEs are summarized in FIGS. 9 and 10.

The 80 times drawn layer containing 1% MEH-PPV displayed a dichroic ratio, measured in emission, of 62 and a dichroic ratio measured in absorption, of 14.

By contrast, the oriented plate of a draw ratio of 3.6 and a thickness of 1.5 mm was characterized by a dichroic ratio, measured both in emission and absorption, of only about 2.

EXAMPLE B (Outside of the Invention)

A display device was constructed according to the schematic of FIG. 3A. A UV lamp (Bioblock, VL-4LC, 4 Watts), operated at 365 nm, was employed as a light source. Instead of the polarized PL layer (2), an unoriented, thick polymer blend plate of 1 mm thickness of HMW PE containing 1% w/w of EHO-OPPE (prepared according to Example A) was placed in between the UV source and a commercial liquid crystal display, consisting of a patterned electrooptical light valve (3) and one absorbing polarizer (2), arranged as shown in FIG. 3A. Selected patterns of the display device (segments) were switched between the "on" and the "off" state, but the switching did not change the appearance of the device. Due to the isotropic emission from the unoriented plate, the entire area was illuminated by the light source, and the device in both switching states showed a dim, continuous, homogeneous yellow-green light.

This comparative example shows that employing a thick, unoriented plate of photoluminescent material, characterized by a dichroic ratio of unity in absorption and emission, in a device configuration according to FIG. 3A, does not yield a display device, that can be switched between two different optical states ("bright" and "dark").

EXAMPLE C (Outside of the Invention)

Example B (Outside of the Invention) was repeated, but instead of an unoriented, polymer blend plate of 1 mm thickness of HMW PE containing 1% w/w of EHO-OPPE, a 70 $\mu$m thin, unoriented layer of UHMW PE containing 1% w/w of EHO-OPPE (prepared according to Example A) was used in the device. Selected patterns of the display device (segments) were switched between the "on" and the "off" state, but the switching did not change the appearance of the device. Due to the isotropic emission from the unoriented layer, the entire area was illuminated by the light source, and the device in both switching states showed a continuous, homogeneous yellow-green light. This comparative example shows that employing a thin, unoriented layer of photoluminescent material, characterized by a dichroic ratio of unity in absorption and emission, in a device configuration according to FIG. 3A, does not yield a display device, that can be switched between two different optical states ("bright" and "dark").

EXAMPLE D (Outside of the Invention)

Example B (Outside of the Invention) was repeated, but instead of an unoriented, polymer blend plate of 1 mm thickness of HMW PE containing 1% w/w of EHO-OPPE, a 1.5 mm thick, oriented plate of the same composition, of a draw-ratio of 3.6 and a dichroic ratio, measured in emission and absorption, of about 2 (prepared according to Example A) was used in the device. Selected patterns of the display device (segments) were switched between the "on" and the "off" state. The switching, indeed, led to a change in brightness, but however, the contrast between the "on" and the "off" state, as perceived by the human eye, was extremely low. One reason for the poor contrast of this device is the fact that the switched segments in their "off" state still exhibit a significant yellow-green emission.

This comparative example shows that employing a thick photoluminescent plate with a moderate polarized absorption and emission does not yield significantly improved characteristics of a liquid crystal display.

EXAMPLE E (Outside of the Invention)

Example B (Outside of the Invention) was repeated, but instead of an unoriented, polymer blend plate of 1 mm thickness of HMW PE containing 1% w/w of EHO-OPPE, an oriented, about 30 $\mu$m thin polymer blend layer of UHMW PE containing 1% w/w of O-OPPE of a draw ratio of about 5 and a dichroic ratio, measured in absorption, of about 3.8 (prepared according to the methods described in Example A), was used in the device. Selected patterns of the display device (segments) were switched between the "on" and the "off" state. The switching, indeed, led to a change in brightness, but however, the contrast between the "on" and the "off" state, as perceived by the human eye, was extremely low. One reason for the poor contrast of this device is the fact that the switched segments in their "off" state still exhibit a significant yellow-green emission.

This comparative example shows that employing a thin photoluminescent layer with a moderate polarized absorption does not yield significantly improved characteristics of a liquid crystal display.

EXAMPLE 1

A display device was constructed according to the schematic of FIG. 3A. For convenience, a UV lamp (Bioblock, VL-4LC, 4 Watts), operated at 365 nm, was employed as a light source. (It should be noted that the latter was not optimized for the particular absorption band of the present photoluminescent materials). The polarized PL layer (2), was a highly oriented, 2 $\mu$m thin polymer blend layer of UHMW PE containing 2% w/w of EHO-OPPE of a draw ratio of 80 and a dichroic ratio, measured in absorption, of 56, and, measured in emission, of 72 (prepared according to Example A), and was placed in between the UV source and a commercial liquid crystal display, consisting of a patterned electrooptical light valve (3) and one absorbing polarizer (4), arranged as shown in FIG. 3A. Selected patterns of the display device (segments) were switched between the "on" and the "off" state. The switching yielded a significant change in brightness, that was perceived by the human eye as a change from a very bright yellow-green to almost dark. In order to quantify the observed outstanding contrast, the absolute brightness of the "on" and the "off" state were measured with a Minolta LS 100 luminance meter, which was fitted with a No 110 and a No 122 close-up lens. The contrast ratio, which hereinafter is defined as the ratio between the brightnesses of the "on" (32 cd/m$^2$) and offs' state (<4 cd/m$^2$), of the device was in excess of 7. For the commercial direct-view. LCD the contrast ratio was about 3.5. By increasing the thickness to 5 µm, and, therewith, the optical density of the polarized PL layer, the brightness was readily increased to more than 65 cd/r$^2$. This example shows that employing a thin, polarized PL layer characterized in a high degree of polarization for both, absorption and emission, yields a liquid crystal display of dramatically improved contrast.

EXAMPLE 2

Example 1 was repeated, but instead of the drawn blend film containing 2 w/w % of EHO-OPPE in UHMW PE, an 80 times drawn blend film containing 1 w/w % MEH-PPV in UHMW PE with a dichroic ratio, measured in emission, of 62, and a dichroic ratio measured in absorption, of 14, prepared according to Example A, was used. Selected patterns of the display device (segments) were switched between the "on" and the "off" state. The switching yielded a significant change in brightness, that was perceived by the human eye as a change from a orange-red to almost dark. The contrast and absolute brightness of the "on" and the "off" state of the device were comparable to the device in Example 1.

This examples illustrates that by appropriately selecting the photoluminescent material, devices of high brightness and high contrast can be prepared that exhibit a different color.

EXAMPLE 3

A display device was constructed according to the schematic of FIG. 5. For convenience, a UV lamp (Bioblock, VL-4LC, 4 Watts), operated at 365 nm, was employed as a light source. (It should be noted that the latter was not optimized for the particular absorption bands of the present photoluminescent materials). The two polarized PL layers (2, 12), were an oriented, 2 µm thin polymer blend layer of UHMW PE containing 2% w/w of EHO-OPPE of a draw ratio of 80 and a dichroic ratio, measured in absorption, of 56, and, measured in emission, of 72 (2) and an oriented. 2 µm thin polymer blend layer of UHMW PE containing 1% w/w MEH-PPV of a draw ratio of 80 and a dichroic ratio, measured in absorption, of 14, and, measured in emission, of 62 (12) (prepared according to Example A). The polarized PL layers (2, 12) were placed with their orientation directions perpendicular to one another and in between the UV source and a commercial liquid crystal display, consisting of a patterned electrooptical light valve (3) and one absorbing polarizer (4), arranged as shown in FIG. 5. Selected patterns of the display device (segments) were switched between the "on" and the "off" state. The switching, led to a significant change in color, that was perceived by the human eye as a change from a bright yellow-green to orange-red.

This examples illustrates that by appropriately selecting and employing two polarized PL layers, display devices of high brightness and high contrast can be prepared that exhibit two different colors in the "on" and off" state.

EXAMPLE 4

A commercial liquid crystalline mixture (K15, BDH Ltd.) was placed onto the 80 times drawn blend films containing 2% w/w of EHO-PPE in UHMW PE and containing 1% w/w MEH-PPV in UHMW PE, respectively, prepared according to Example A were used. The liquid crystalline material was found to immediately adopt a uniaxial orientation. This example shows that the layers according to the present invention also can be placed inside a liquid crystal cell that operates as a light valve in a display device, and functions not only as the polarized PL layer but also as orientation layer (3d in FIG. 3C) for the liquid crystalline material.

EXAMPLE 5

A display device was constructed according to the schematic of FIG. 6, however without the cut-off filter (8). For convenience, a UV lamp (Bioblock, VL-4LC, 4 Watts), operated at 365 mm, was employed as a light source. (It should be noted that the latter was not optimized for the particular absorption bands of the present photoluminescent materials). The polarized PL layer (2), was an oriented, 2 µm thin polymer blend layer of UHMW PE containing 2% w/w of EHO-OPPE of a draw ratio of 80 and a dichroic ratio, measured in absorption, of 56, and, measured in emission, of 72(prepared according to Example A). The polarized PL layer (2) was placed in between the viewer and a patterned liquid crystal electrooptical light valve (3) and one UV-active, absorbing polarizer (Polaroid HNP-B) (4), arranged as shown in FIG. 6. Selected patterns of the display device (segments) were switched between the "on" and the "off" state. The switching, led to a change from 8 to less than 4 cd/m$^2$. The limited contrast and absolute brightness of the "on" and doff states relative to the devices in the previous examples are attributable to the limited transparency of the commercial UV sheet polarizer used. Notably, a clearly improved viewing angle was observed when comparing this device (>170°) with the devices in the above examples.

This examples illustrates that device configurations in which the excitation light is switched according to this invention lead to displays of drastically improved viewing angle.

What is claimed is:

1. An optoelectronic display device of high brightness and high contrast comprising:
    at least two thin photoluminescent layers having unequal photoemission or absorption spectra or both, wherein said at least two thin photoluminescent layers are characterized in a high degree of polarization in their absorption and are characterized in an emission which is either polarized or not, wherein said layers have a thickness of less than about 1 mm and a dichroic ratio in their absorption of more than about 5, and
said thin photoluminescent layers comprising one or more at least partially conjugated oligomers or one or more at least partially conjugated polymers or both; and
    wherein said photoluminescent layers are located between a viewer and an electrooptical light valve; or said electrooptical light valve is located between the viewer and said photoluminescent layers; or said photoluminescent layers are inside said electrooptical light valve.

2. An optoelectronic display device according to claim 1, wherein said photoluminescent layers have a dichroic ratio in its emission of more than about 5.

3. A display device according to claim 1, wherein said electrooptical light valve includes a liquid crystal cell having a liquid crystal layer which is electrically switchable.

4. A display device according to claim 1, wherein said device comprises a polarizer selected from the group consisting of absorbing polarizer, scattering polarizer and reflecting polarizer,
   said polarizer being located between said photoluminescent layers and the viewer, or said photoluminescent layers being located between the viewer and said polarizer.

5. A display device according to claim 1, wherein said photoluminescent layers are located between the viewer and said electrooptical light valve.

6. A display device according to claim 1, wherein said electrooptical light valve is located between the viewer and said photoluminescent layers.

7. A display device according to claim 1, wherein said thin photoluminescent layers have a thickness of less than 300 $\mu$m.

8. A display device according to claim 1, wherein said thin photoluminescent layers have a thickness of less than 50 $\mu$m.

9. A display device according to claim 1, wherein said thin photoluminescent layers have a thickness of less than 10 $\mu$m.

10. A display device according to claim 1, wherein said thin photoluminescent layers have a dichroic ratio in their absorption of more than 10.

11. A display device according to claim 1, wherein said thin photoluminescent layers have a dichroic ratio in their absorption of more than 20.

12. A display device according to claim 1, wherein said thin photoluminescent layers have a dichroic ratio in their emission of more than 15.

13. A display device according to claim 1, wherein said thin photoluminescent layers have a dichroic ratio in their emission of more than 35.

14. An optoelectronic display device of high brightness and high contrast comprising at least one thin photoluminescent layer that is characterized in a high degree of polarization in its absorption and that is characterized in an emission which is either polarized or not, wherein said layer has a thickness of less than about 1 mm and a dichroic ratio in its absorption of more than about 5, and
   said thin photoluminescent layer comprises one or more at least partially conjugated oligomers or one or more at least partially conjugated polymers or both, wherein said display device additionally comprises at least one electrooptical light valve, said photoluminescent layer being located inside said electrooptical light valve.

15. A display device according to claim 14, wherein said thin photoluminescent layer is located inside said electrooptical light valve and acts as orientation layer.

16. A display device according to claim 1, wherein said thin photoluminescent layers are patterned.

17. A display device according to claim 1 that is characterized in that said device comprises multiple elements, pixels or arrays thereof of said photoluminescent layers.

18. A display device according to claim 1 that is characterized in that said device comprises multiple electrooptical light valves.

19. A display device according to claim 1, wherein said display device further comprises a light source and wherein said light source is characterized in that its emission spectrum overlaps with the absorption spectrum of said photoluminescent layers.

20. A display device according to claim 1 that additionally comprises at least one dichroic mirror, said photoluminescent layers being located between said at least one dichroic mirror and the viewer.

21. A display device according to claim 1, wherein said thin photoluminescent layers are obtained by a technique selected from the group consisting of tensile orientation, oriented growth, friction, photo-induced alignment and alignment in electric, magnetic and flow fields or combinations thereof, of photoluminescent substances.

22. A display device according to claim 1, wherein said oligomers or polymers comprise one or more unsubstituted or substituted phenyleneethynylene moieties wherein said moieties may be the same or different at each occurrence.

23. A display device according to claim 1, wherein said device has a viewing angle of 160 degrees or more or a brightness of 50 cd/m$^2$ or more, or both.

* * * * *